United States Patent
Sugimoto et al.

(10) Patent No.: US 9,417,553 B2
(45) Date of Patent: Aug. 16, 2016

(54) IMAGE FORMING APPARATUS

(71) Applicant: BROTHER KOGYO KABUSHIKI KAISHA, Nagoya-shi, Aichi-ken (JP)

(72) Inventors: Tasuku Sugimoto, Nagoya (JP); Hironori Hirata, Nagoya (JP); Ryo Ito, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/796,118

(22) Filed: Jul. 10, 2015

(65) Prior Publication Data

US 2016/0018753 A1    Jan. 21, 2016

(30) Foreign Application Priority Data

Jul. 17, 2014  (JP) ................................. 2014-146609
Jun. 30, 2015  (JP) ................................. 2015-130974

(51) Int. Cl.
*G03G 15/00* (2006.01)
*G03G 15/043* (2006.01)
*G02B 26/12* (2006.01)

(52) U.S. Cl.
CPC ............ *G03G 15/043* (2013.01); *G02B 26/129* (2013.01)

(58) Field of Classification Search
CPC .......................... G03G 15/043; G03G 15/6529
See application file for complete search history.

(56) References Cited

U.S. PATENT DOCUMENTS

| 2005/0281545 A1 | 12/2005 | Sugimoto et al. |
| 2007/0024222 A1* | 2/2007 | Sugimoto ............ G05B 19/416 318/268 |
| 2010/0245521 A1 | 9/2010 | Kubo |

FOREIGN PATENT DOCUMENTS

| JP | 2006-6066 A | 1/2006 |
| JP | 2006-174593 A | 6/2006 |
| JP | 2010-237622 A | 10/2010 |

* cited by examiner

*Primary Examiner* — Roy Y Yi
(74) *Attorney, Agent, or Firm* — Merchant & Gould P.C.

(57) ABSTRACT

A brushless motor has a rotor and a stator, the stator having coils corresponding to respective phases of the brushless motor. A polygon mirror has a plurality of mirror surfaces and is configured to rotate together with the rotor. When executed by the processor, the instructions cause the processor to: detect first timing at which the light sensor receives a light beam emitted from the light source and reflected by one of the plurality of mirror surfaces when the rotor is rotating; acquire first information identifying a relationship between the first timing and second timing at which an inductive voltage reaches a particular reference value, the inductive voltage being generated in at least one coil in a non-energization state due to rotation of the rotor; and perform a phase switching control of the brushless motor based on the first timing and the first information.

20 Claims, 11 Drawing Sheets

IMAGE FORMING APPARATUS

CROSS REFERENCE TO RELATED APPLICATIONS

This application claims priority from Japanese Patent Application No. 2014-146609 filed Jul. 17, 2014 and Japanese Patent Application No. 2015-130974 filed Jun. 30, 2015. The entire content of each of the priority applications is incorporated herein by reference.

TECHNICAL FIELD

The disclosure relates to an image forming apparatus, a method of controlling an image forming apparatus, and a storage medium storing a program for controlling an image forming apparatus.

BACKGROUND

An image forming apparatus that includes a light source, a brushless motor and a rotating polygon mirror is known. In the image forming apparatus configured as described above, a light beam emitted from the light source is reflected off the mirror surface of the rotating polygon mirror which is driven to rotate by the brushless motor, and is guided to the surface of a photosensitive member. In this way, a scanning line produced by the light beam is formed on the surface of the photosensitive member.

In the image forming apparatus configured as described above, phase switching control that switches, with appropriate timing corresponding to the position of the rotor of the brushless motor, the energization/non-energization state of each phase of a stator is performed. The detection of the position of the rotor is performed with, for example, a plurality of Hall elements. A technology is proposed in which the detection of the position of the rotor is performed based on the value of an inductive voltage produced in a coil while the rotor is being rotated. In this technology, since it is not necessary to provide a sensor such as a Hall element for detecting the position of the rotor, it is possible to simplify the configuration of the apparatus and reduce the size and cost of the apparatus.

SUMMARY

According to one aspect, this specification discloses an image forming apparatus. The image forming apparatus includes a brushless motor, a polygon mirror, a light source, a light sensor, a processor, and a memory storing instructions. The brushless motor has a rotor and a stator, the stator having coils corresponding to respective phases of the brushless motor. The polygon mirror has a plurality of mirror surfaces and is configured to rotate together with the rotor. When executed by the processor, the instructions cause the processor to: detect first timing at which the light sensor receives a light beam emitted from the light source and reflected by one of the plurality of mirror surfaces when the rotor is rotating; acquire first information identifying a relationship between the first timing and second timing at which an inductive voltage reaches a particular reference value, the inductive voltage being generated in at least one coil in a non-energization state due to rotation of the rotor; and perform a phase switching control of the brushless motor based on the first timing and the first information.

According to another aspect, this specification also discloses a method of controlling an image forming apparatus including: a brushless motor having a rotor and a stator, the stator having coils corresponding to respective phases of the brushless motor; a polygon mirror having a plurality of mirror surfaces and configured to rotate together with the rotor; a light source; and a light sensor. The method includes: detecting first timing at which the light sensor receives a light beam emitted from the light source and reflected by one of the plurality of mirror surfaces when the rotor is rotating; acquiring first information identifying a relationship between the first timing and second timing at which an inductive voltage reaches a particular reference value, the inductive voltage being generated in at least one coil in a non-energization state due to rotation of the rotor; and performing a phase switching control of the brushless motor based on the first timing and the first information.

According to still another aspect, this specification also discloses a non-transitory storage medium storing a set of program instructions executable on an image forming apparatus including: a brushless motor having a rotor and a stator, the stator having coils corresponding to respective phases of the brushless motor; a polygon mirror having a plurality of mirror surfaces and configured to rotate together with the rotor; a light source; and a light sensor. The set of program instructions includes: detecting first timing at which the light sensor receives a light beam emitted from the light source and reflected by one of the plurality of mirror surfaces when the rotor is rotating; acquiring first information identifying a relationship between the first timing and second timing at which an inductive voltage reaches a particular reference value, the inductive voltage being generated in at least one coil in a non-energization state due to rotation of the rotor; and performing a phase switching control of the brushless motor based on the first timing and the first information.

The technology disclosed in this specification can be realized in various modes. For example, the technology can be realized in modes of an image forming apparatus, a method of controlling an image forming apparatus, a computer program for realizing functions of such apparatus or method, a non-transitory storage medium storing such computer program, and so on.

BRIEF DESCRIPTION OF THE DRAWINGS

Embodiments in accordance with the disclosure will be described in detail with reference to the following figures wherein.

DETAILED DESCRIPTION

In a period (hereinafter referred to as a "regeneration period") immediately after the coil of a certain phase of the brushless motor is brought into the non-energization state, a counter-electromotive voltage is produced in the coil of the phase, and thus the value of the inductive voltage cannot be properly detected, with the result that it is impossible to perform the detection of the position of the rotor based on the value of the inductive voltage. Since the regeneration period is prolonged as a current flowing through the coil is increased, the regeneration period is prolonged when the brushless motor is accelerated. Hence, when the brushless motor is accelerated, it may be impossible to accurately perform the detection of the position of the rotor based on the value of the inductive voltage. When the rotation speed of the brushless motor is increased, the cycle of the phase switching is shortened, and thus the ratio of the regeneration period to the cycle of the phase switching is increased. Hence, when the brushless motor is rotated at a high speed, too, it may be impossible to accurately perform the detection of the position of the rotor based on the value of the inductive voltage. As described above, depending on the state of the operation of the brushless motor, it may be impossible to accurately perform the detection of the position of the rotor based on the value of the inductive voltage, with the result that it may be impossible to accurately perform phase switching control of the brushless motor.

Some aspects of the disclosure will be described while referring to the accompanying drawings.

Figure 1:
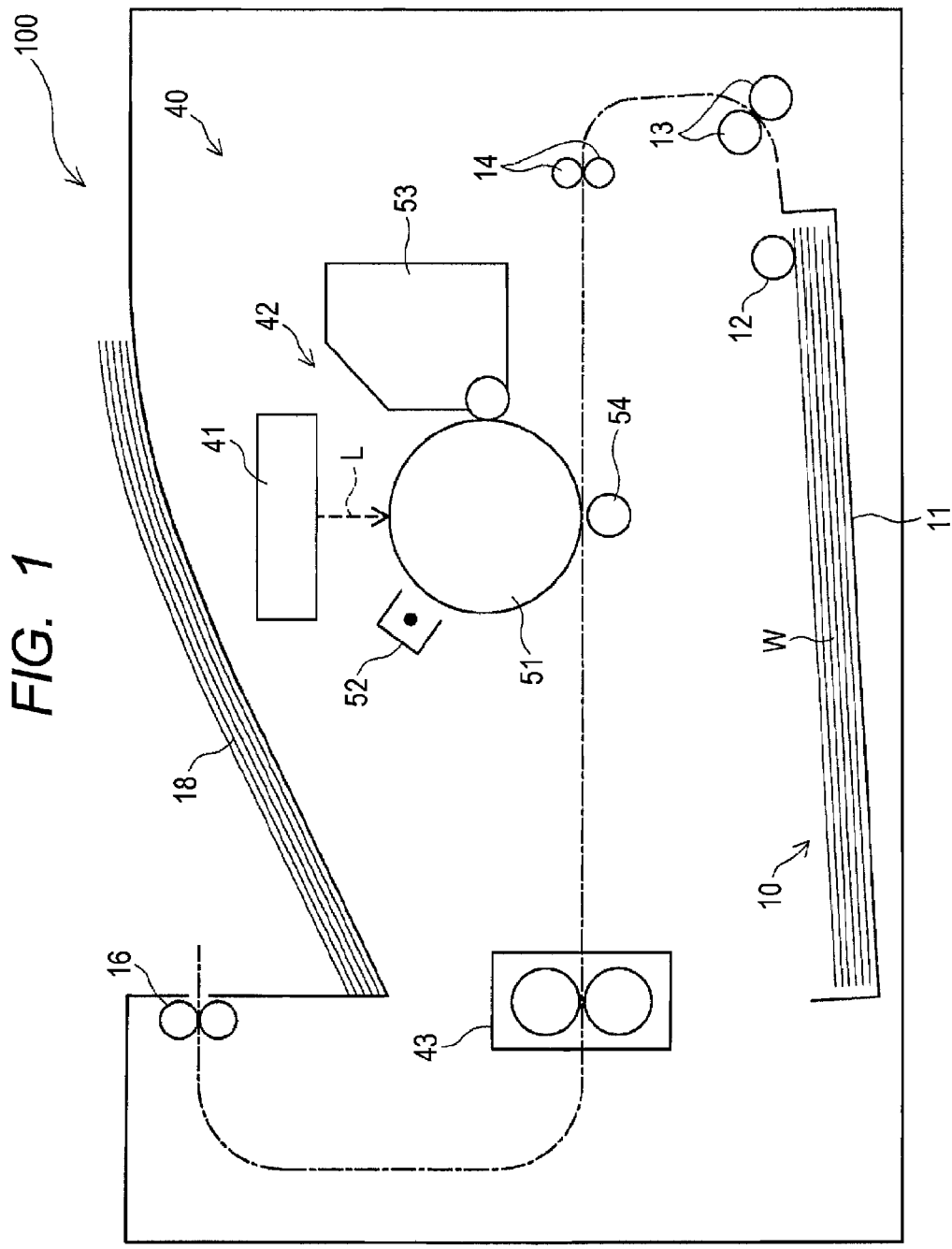
FIG. 1 is a schematic view showing the configuration of a printer.

The configuration of a printer 100 according to an embodiment will be described with reference to FIGS. 1 to 3. The printer 100 of the present embodiment is an electrophotographic image forming apparatus. As shown in FIG. 1, the printer 100 includes a paper feeding unit 10 and an image forming unit 40.

The paper feeding unit 10 includes a tray 11, a pickup roller 12, a conveying roller 13 and a registration roller 14. Sheets W stored in the tray 11 are taken out with the pickup roller 12 one sheet at a time, the sheet W is conveyed by the conveying roller 13, its position is corrected with the registration roller 14 and the sheet W is fed to the image forming unit 40 with particular timing.

The image forming unit 40 includes an exposure unit 41, a process unit 42 and a fixing unit 43. The exposure unit 41 applies a laser light L to a photosensitive member 51, which will be described later. The configuration of the exposure unit 41 will be described later.

The process unit 42 includes the photosensitive member 51, a charger 52, a developing unit 53 and a transfer roller 54. The charger 52 uniformly charges the surface of the photosensitive member 51. When the laser light L is irradiated from the exposure unit 41 described above onto the surface of the photosensitive member 51 uniformly charged by the charger 52, an electrostatic latent image is formed on the surface of the photosensitive member 51. The developing unit 53 supplies toner to develop the electrostatic latent image formed on the surface of the photosensitive member 51. In this way, a toner image is formed on the surface of the photosensitive member 51. The transfer roller 54 is arranged opposite the photosensitive member 51, and transfers the toner image formed on the surface of the photosensitive member 51 to the sheet W which is conveyed.

The fixing unit 43 is arranged on the downstream side in the conveying direction of the sheet W with respect to the photosensitive member 51, and fixes the toner image to the sheet W by heat. Thereafter, the sheet W is discharged through a discharge roller 16 to a discharge tray 18 formed on the upper surface of the printer 100.

Figure 2:
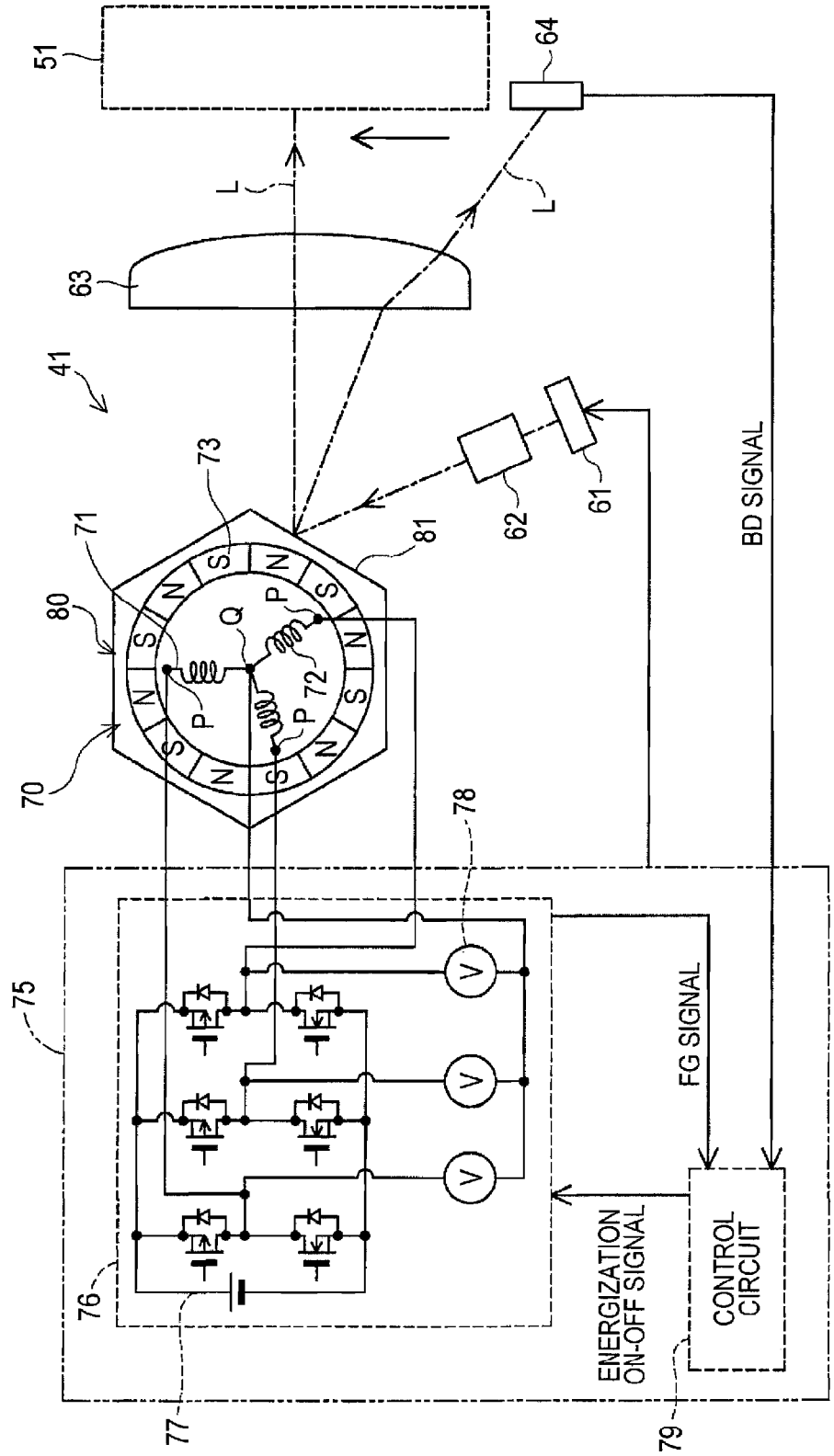
FIG. 2 is a schematic view showing the configuration of an exposure unit.

As shown in FIG. 2, the exposure unit 41 includes a laser diode (hereinafter referred to as an "LD") 61 that emits the laser light L, a first lens portion 62, a polygon mirror 80, a brushless motor 70, a second lens portion 63, a beam detector (hereinafter referred to as a "BD") 64 and a control board 75. The LD 61 is an example of a light source, and the laser light L is an example of a light beam. The polygon mirror 80 is an example of a rotating polygon mirror, and the BD 64 is an example of an optical sensor portion.

The brushless motor 70 is a three-phase brushless DC motor, and includes a stator 71, a rotor 73 where a 12-pole permanent magnet is arranged. The stator 71 includes coils 72 corresponding to the three phases (U phase, V phase, and W phase). The coils 72 are electrically connected to each other by star wiring connection.

The polygon mirror 80 includes 6 mirror surfaces 81 that are arranged to form the side surface of a regular hexagonal prism. The polygon mirror 80 is driven to rotate by the brushless motor 70. Specifically, the polygon mirror 80 is fixed to the rotor 73 of the brushless motor 70, and is rotated as the rotor 73 is rotated.

The first lens portion 62 is formed with, for example, a cylindrical lens, and applies the laser light L emitted from the LD 61 toward the polygon mirror 80. The second lens portion 63 is formed with, for example, an fθ lens, and applies the laser light L applied from the first lens portion 62 and reflected off the mirror surfaces 81 of the polygon mirror 80 toward the surface of the photosensitive member 51.

When the polygon mirror 80 is rotated as the rotor 73 is rotated, an angle of the mirror surface 81 with respect to the direction of the laser light L from the first lens portion 62 is changed cyclically, and thus the laser light L is cyclically deflected by the mirror surface 81. In this way, a scanning line produced by the laser light L is formed on the surface of the photosensitive member 51.

The BD 64 is arranged at such a position that the laser light L reflected off the mirror surface 81 enters the BD 64 in a state where the angle of the mirror surface 81 with respect to the direction of the laser light L is a specific angle. The BD 64 outputs a BD signal (see FIG. 4) whose level is a L (Low)-level when the laser light L does not enter the BD 64 and whose level is a H (High)-level when the laser light L enters the BD 64. The timing at which the laser light L enters the BD 64 is an example of a first timing. For example, the BD signal is used for the determination of timing at which the scanning line is drawn by the laser light L. By referring to the BD signal, the rotation cycle (the rotation speed) of the polygon mirror 80 can be determined.

The control board 75 includes a drive circuit 76 that rotates and drives the brushless motor 70. The drive circuit 76 includes an inverter circuit 77 that switches the energization/non-energization state of each of the coils 72 of the brushless motor 70 and a voltage detection circuit 78 that detects the voltage of each of the coils 72 of the brushless motor 70. The control board 75 also includes a control circuit 79 that supplies an energization on-off signal to the inverter circuit 77 of the drive circuit 76. Each circuit of the control board 75 is formed with one or a plurality of ASICs.

The control board 75 performs light emission control of the LD 61 and phase switching control of the brushless motor 70 according to an instruction from a CPU 31, which will be described later. The phase switching control of the brushless motor 70 is the control that switches the energization/non-energization state of the coil 72 of each phase of the stator 71 with appropriate timing corresponding to the position of the rotor 73 which is being rotated. The phase switching control of the brushless motor 70 will be described later. The control board 75 or a combination between the control board 75 and the CPU 31 is an example of the controller.

Figure 3:
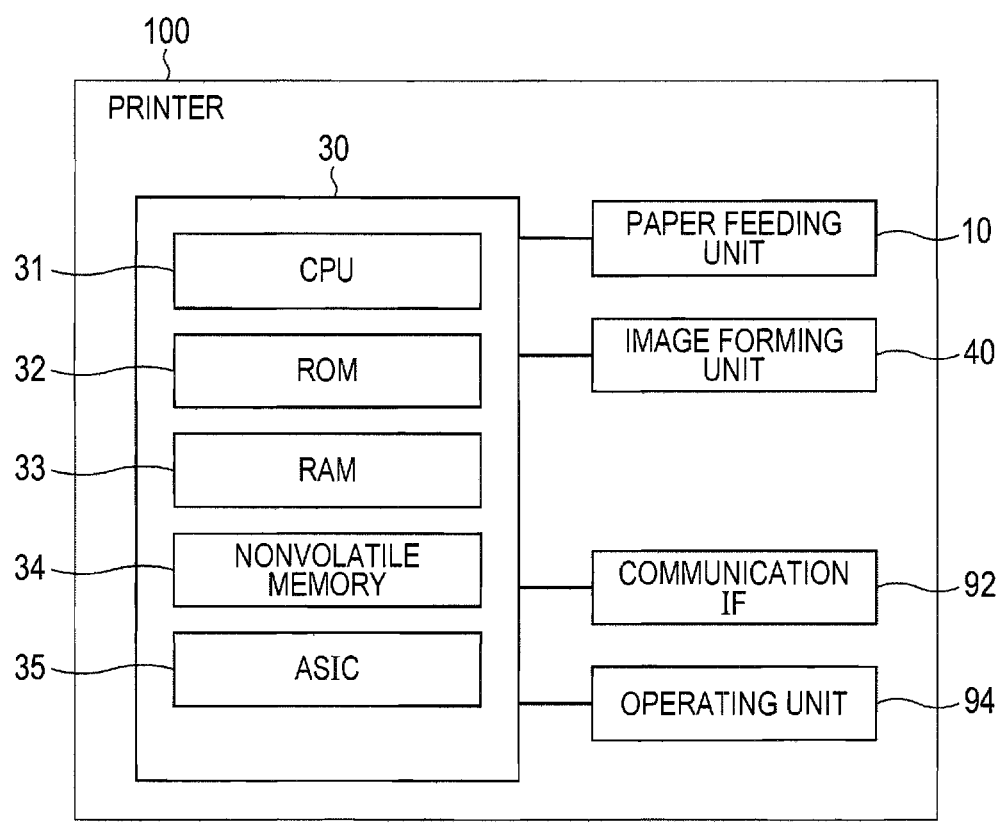
FIG. 3 is a block diagram showing the configuration of the printer.

As shown in FIG. 3, the printer 100 includes, in addition to the image forming unit 40 and so on described above, a communication interface (IF) 92 for connection to an external apparatus, an operation unit 94 that receives an operation by a user and a controller 30 that controls the printer 100.

The operation unit 94 includes various types of buttons and a touch panel (both of which are not shown) that receive the operation by the user. The touch panel also functions as a display unit that displays various types of information. The communication interface 92 is hardware that allows communication with the external apparatus. Specifically, the communication interface 92 is, for example, a network interface, a serial communication interface, or a parallel communication interface. The printer 100 receives image data that is a print target through the communication interface 92 from the external apparatus.

The controller 30 includes the CPU 31, a ROM 32, a RAM 33, a nonvolatile memory 34, and an ASIC (Application Specific Integrated Circuit) 35. In the ROM 32, a control program for controlling the printer 100, various types of settings, initial values and so on are stored. The RAM 33 is used as an operation area when the CPU 31 performs various types of programs or an area that temporarily stores data. The nonvolatile memory 34 is a rewritable memory such as an NVRAM, a flash memory, a HDD, an EEPROM, and so on. The ASIC 35 is a hardware circuit dedicated for, for example, image processing.

The CPU 31 controls each element of the printer 100 according to the control program read from the ROM 32 and signals fed from various types of sensors. The CPU 31 is an example of the controller.

Figure 4:
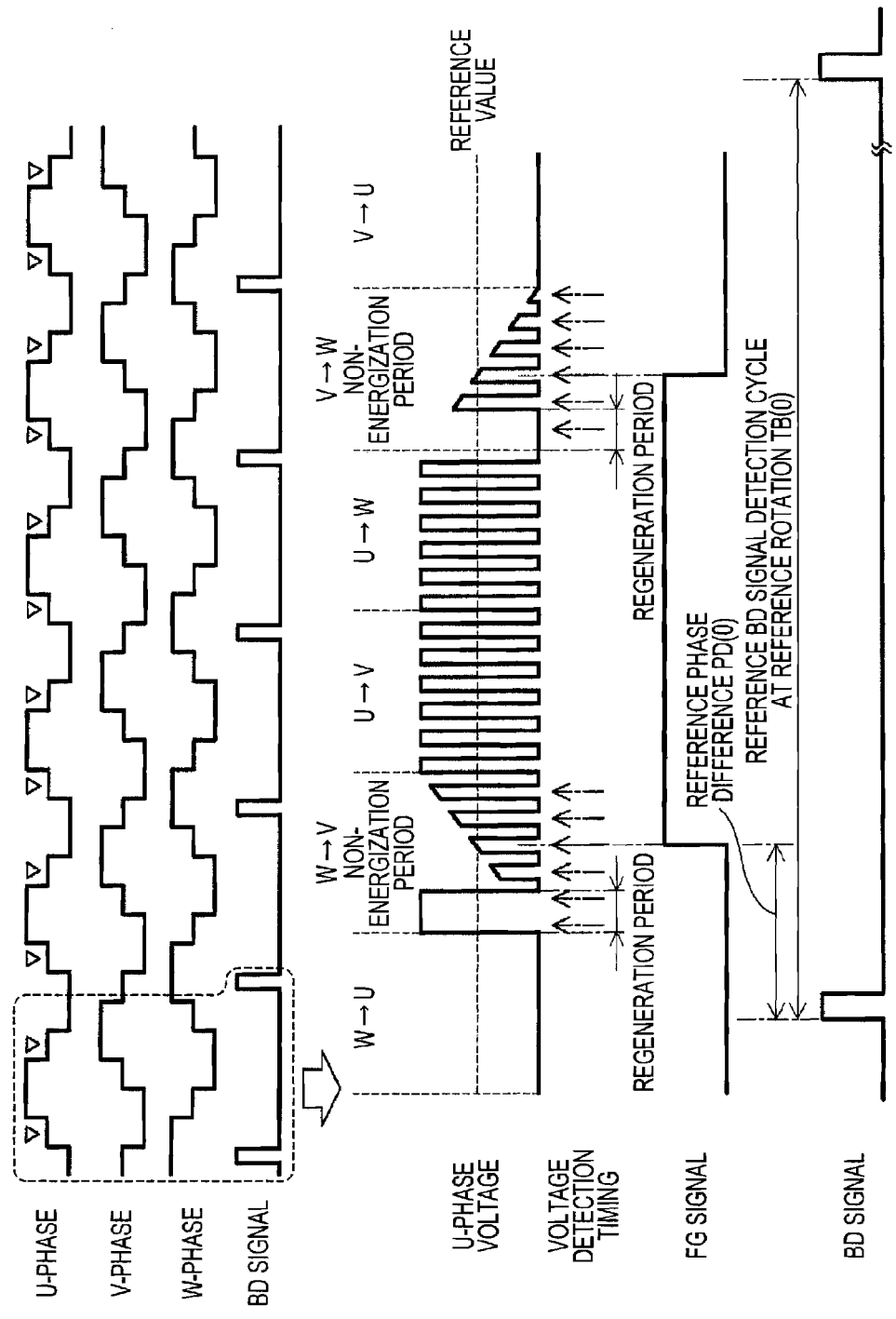
FIG. 4 is a timing chart showing the detection voltage of a U-phase coil and the waveforms of an FG signal and a BD signal.

As described above, the phase switching control of the brushless motor 70 is the control that switches the energization/non-energization state of the coil 72 of each phase of the stator 71 with appropriate timing corresponding to the position of the rotor 73 which is being rotated. Specifically, as shown in the upper part of FIG. 4, the phase switching control is the control that switches the coil 72 of each phase sequentially from a positive voltage state, to an off state, and to a negative voltage state. The upper part of FIG. 4 shows a state of each phase in a period during which the rotor 73 is rotated one revolution. Here, in order to accurately perform the phase switching control of the brushless motor 70, it is necessary to accurately detect the position of the rotor 73. The detection of the position of the rotor 73 can be realized by the utilization of the sensor for position detection such as a Hall element. However, in the printer 100 according to the present embodiment, in order for the apparatus to be simplified in configuration and to be reduced in size and cost, the detection of the position of the rotor 73 is performed without use of a sensor such as a Hall element.

The printer 100 of the present embodiment can perform the detection of the position of the rotor 73 with reference to the value of an inductive voltage. As shown in FIG. 2, when the rotor 73 of the brushless motor 70 is rotated, an S-pole magnet and an N-pole magnet alternately approach each coil 72 of the stator 71. Hence, a magnetic flux within each coil 72 is changed, and thus an inductive voltage is produced in each coil 72. The inductive voltage shows a waveform that changes cyclically to a different level depending on whether the S pole approaches the coil 72 or the N pole approaches the coil 72. Hence, by referring to the inductive voltage, it is also possible to detect the positional relationship between each coil 72 and the magnet of the rotor 73, that is, the position of the rotor 73 with respect to the stator 71.

In order to detect the inductive voltage described above, as shown in FIG. 2, the voltage detection circuit 78 of the drive circuit 76 includes three detectors corresponding to the three coils 72. Each detector outputs a detection signal corresponding to a potential difference between an end point P (an end portion of the coil 72 on the side connected to the drive circuit 76) of the corresponding coil and an intermediate point Q of the star wiring connection. The drive circuit 76 converts the detection signal from each detector, through a comparator (not shown), for example, into a signal (hereinafter referred to as an "FG signal") whose level is switched according to the change in the inductive voltage (the switching of the polarity of the magnet approaching each coil).

The lower part of FIG. 4 shows the detection voltage of the U phase and the waveform of the FG signal obtained from the detection voltage of the U phase in a period surrounded by broken lines in the upper part of FIG. 4 (in a period during which the rotor 73 is rotated one sixth of a revolution. In the non-energization period of the coil 72 of the U phase (a period indicated by a triangular mark in the upper part of FIG. 4), an inductive voltage is produced in the coil 72 of the U phase. The FG signal is a signal that identifies timing at which the inductive voltage produced in the coil 72 of the U phase in the non-energization state reaches a particular reference value. The timing at which the inductive voltage reaches the reference value is an example of a second timing. Specifically, the FG signal changes from the L-level to the H-level at timing when the detection voltage of the coil 72 of the U phase in the non-energization period is switched from a state where it is lower than the reference value to a state where it is higher than the reference value, whereas the FG signal changes from the H-level to the L-level at timing when the detection voltage is switched from a state where it is higher than the reference value to a state where it is lower than the reference value. By referring to the FG signal, it is possible to determine the position of the rotor 73 with respect to the stator 71. The same is true for the FG signals of the other phases.

The voltage detection circuit 78 detects the voltage value of the coil 72 in the non-energization state in accordance with the PWM cycle, and the drive circuit 76 generates the FG signal shown in FIG. 4 based on the detected voltage value. The control circuit 79 acquires the FG signal from the drive circuit 76, generates an energization on-off signal based on the acquired FG signal and supplies the energization on-off signal to the inverter circuit 77 of the drive circuit 76. In this way, the phase switching control of the brushless motor 70 is realized.

Here, as shown in FIG. 4, in a period (hereinafter referred to as a "regeneration period") immediately after the coil 72 of a certain phase of the brushless motor 70 is brought into the non-energization state, a counter-electromotive voltage is produced, and thus the voltage is fixed to a particular value. Hence, in the regeneration period, it is impossible to properly detect the inductive voltage.

Since the length of the regeneration period is proportional to the current value of the coil 72 immediately before the regeneration period, when the brushless motor 70 is accelerated, the regeneration period is prolonged. As shown in FIG.

5, when the regeneration period is prolonged beyond a certain extent, it becomes impossible to detect the timing at which the inductive voltage produced in the coil 72 reaches a particular reference value. Hence, when the brushless motor 70 is accelerated, it is impossible to accurately detect the positon of the rotor 73 based on the value of the inductive voltage, with the result that it may be impossible to accurately perform the phase switching control of the brushless motor 70.

The length of the regeneration period is not related to the rotation speed of the brushless motor 70. Hence, when the rotation speed of the brushless motor 70 is increased to shorten the cycle of the phase switching, the ratio of the regeneration period to the cycle of the phase switching is increased. Thus, when the brushless motor 70 is rotated at a high speed, too, it is impossible to accurately detect the positon of the rotor 73 based on the value of the inductive voltage, with the result that it may be impossible to accurately perform the phase switching control of the brushless motor 70.

The printer 100 of the present embodiment can perform not only the phase switching control of the brushless motor 70 based on the inductive voltage (FG signal) described above but also the phase switching control of the brushless motor 70 based on the BD signal.

As described above, the BD 64 is arranged in a position in which the laser light L enters the BD 64 in a state where the mirror surface 81 of the polygon mirror 80 is a specific angle. The BD signal outputted from the BD 64 is at the L-level in a state where the laser light L does not enter the BD 64 whereas the BD signal is at the H-level in a state where the laser light L enters the BD 64 (see FIG. 4). Hence, by referring to the BD signal, it is possible to obtain the rotation cycle (the rotation speed) of the polygon mirror 80, that is, the rotation cycle (the rotation speed) of the rotor 73. However, since in general, the angle of the mirror surface 81 of the polygon mirror 80 is not related to the position of the magnet of the rotor 73, it is impossible to detect the position of the rotor 73 with only the BD signal. In the present embodiment, since the polygon mirror 80 has six mirror surfaces 81, as shown in the upper part of FIG. 4, while the polygon mirror 80 (the rotor 73) is rotated one revolution, the number of times the laser light L enters the BD 64 is six.

In the present embodiment, as shown in the lower part of FIG. 4, the phase difference between the BD signal and the FG signal is used for detecting the position of the rotor 73. The phase difference between the BD signal and the FG signal is information that identifies a relative relationship between timing at which the laser light L enters the BD 64 identified by the BD signal and timing at which the inductive voltage reaches the reference value identified by the FG signal. In the present embodiment, the phase difference PD between the BD signal and the FG signal is represented by time. The phase difference between the BD signal and the FG signal is an example of first information.

As described above, since the FG signal is a signal for detecting the positon of the rotor 73, by referring to the BD signal and the phase difference described above, as shown in FIG. 6, it is possible to determine the timing at which the phase switching control is performed on the brushless motor 70. Specifically, by using, as a reference time, a timing delayed by the phase difference PD from detection of a reference BD signal, the phase of the brushless motor 70 is switched at equal intervals from the reference time. Here, the reference BD signal is a BD signal that is used as a reference for determining phase switching timing of the brushless motor 70. And, when the next reference BD signal is detected, by using, as a reference time, a timing delayed by the phase difference PD from detection the newly-detected reference BD signal, the phase of the brushless motor 70 is switched at equal intervals from the reference time. This operation is performed repeatedly. In the present embodiment in which the phase is switched six times within a period of a detection cycle TB of the reference BD signal ("reference BD signal detection cycle TB"), the timing delayed by the phase difference PD from the timing at which the laser light L enters the BD 64 and specified by the reference BD signal (the timing at which the BD signal rises) is used as the reference time, and, each timing at which one sixth of the reference BD signal detection cycle TB (TB/6) from the reference time has elapsed is assumed to be the timing at which the three phases of the brushless motor 70 are switched. According to the phase switching signal generated in this way, with appropriate timing corresponding to the position of the rotor 73, the phase switching control of the brushless motor 70 can be performed. The reference BD signals used as the reference for determining the phase switching timing of the brushless motor 70 need not be neighboring BD signals. That is, the BD signals of arbitrary interval, such as every three BD signals or every five BD signals, may be used as the reference BD signals.

Figure 6:
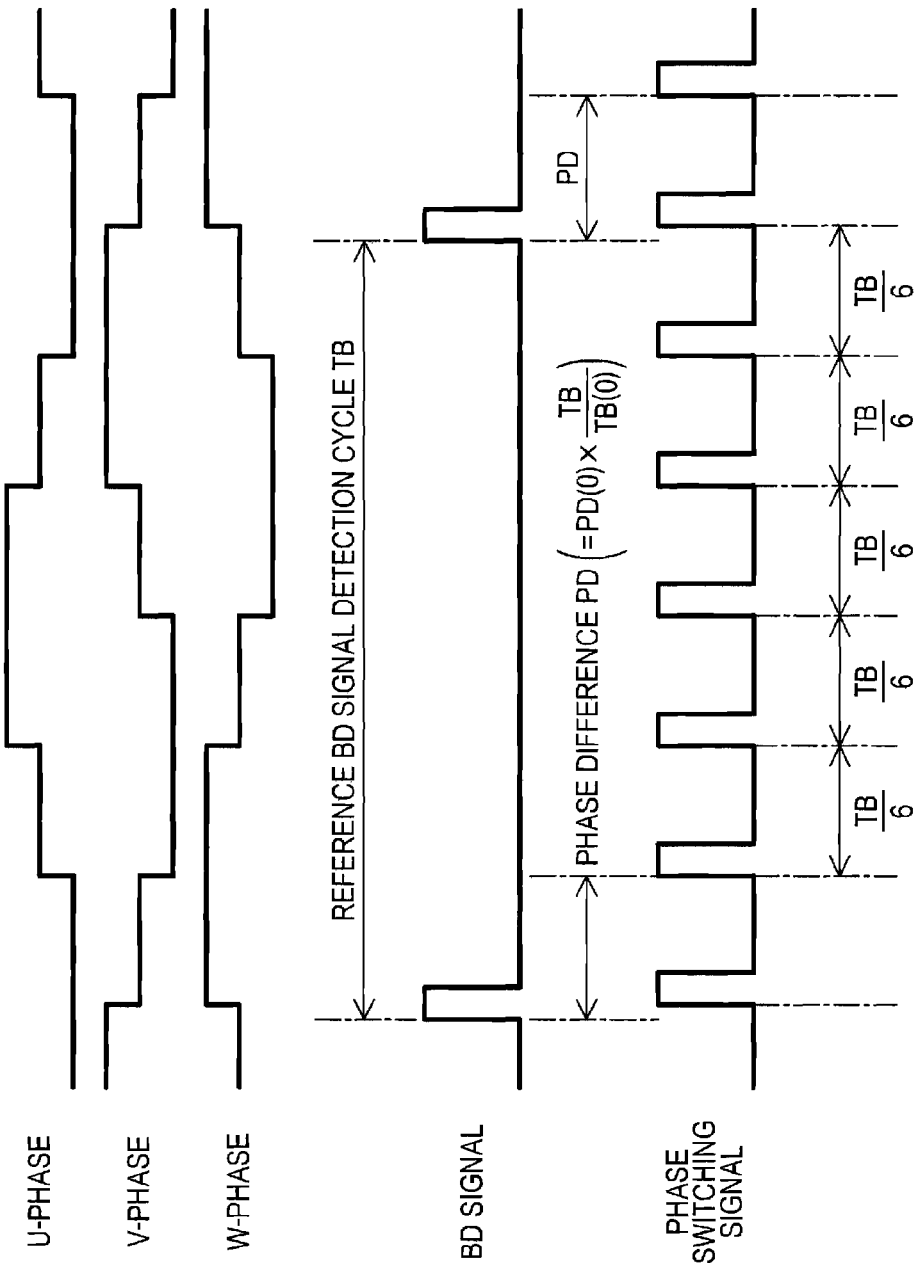
FIG. 6 is a timing chart showing the waveforms of the BD signal and a phase switching signal.

When the phase difference PD between the BD signal and the FG signal is represented by time, the phase difference PD is proportional to the reference BD signal detection cycle TB. Hence, in the present embodiment, as shown in FIG. 6, the phase difference PD at the time of performing the phase switching control is calculated according to equation (1) below. In equation (1), the "PD(0)" represents the phase difference between the BD signal and the FG signal when the rotor 73 is rotated in an operation state where the inductive voltage can be accurately detected (hereinafter referred to as "at the time of the reference rotation"), the "TB" represents the detection cycle of the reference BD signal when the phase switching control is performed, and the "TB(0)" represents the detection cycle of the reference BD signal at the time of the reference rotation ("reference BD signal detection cycle at reference rotation").

$$PD=PD(0) \times TB/TB(0) \quad (1)$$

The specific flow of the phase switching control of the brushless motor 70 in the printer 100 will be described with reference to FIG. 7. The phase switching control is started when a print instruction is inputted to the printer 100 through the communication interface 92 or the operation unit 94. Although the individual steps of the phase switching control are performed by the control board 75 according to an instruction from the CPU 31, for convenience, in the following description, it is assumed that the CPU 31 performs each step.

The CPU 31 first rotates and drives the brushless motor 70 by forced commutation (S110). Then, the CPU 31 generates the FG signal based on the inductive voltage of the coil 72 detected by the voltage detection circuit 78, and starts the phase switching control of the brushless motor 70 based on the FG signal (S120).

Then, the CPU 31 turns on the LD 61 in order to obtain the BD signal (S130), determines the phase difference (the reference phase difference PD(0) shown in FIG. 4) between the FG signal and the BD signal acquired and stores the phase difference in a storage area such as the RAM 33. In the present embodiment, the CPU 31 also stores the reference BD signal detection cycle TB when the reference phase difference PD(0) is determined (the reference BD signal detection cycle at reference rotation TB(0)). When the phase difference between the FG signal and the BD signal is stored, the printer 100 is brought into a state where the printer 100 can perform not only the phase switching control based on the FG signal but also the phase switching control based on the BD signal and the phase difference.

Thereafter, the CPU 31 performs the phase switching control of the brushless motor 70 in a method corresponding to the state of the operation of the brushless motor 70. Specifically, the CPU 31 determines whether the rotation speed of the brushless motor 70 is equal to or higher than a particular threshold value Va or the brushless motor 70 is being accelerated (S150). When it is determined that the rotation speed of the brushless motor 70 is equal to or higher than a particular threshold value Va or the brushless motor 70 is being accelerated (S150:YES), the CPU 31 performs the phase switching control of the brushless motor 70 based on the BD signal and the phase difference (S160). Specifically, the CPU 31 calculates the phase difference PD according to equation (1) described above from the reference phase difference PD(0) and the reference BD signal detection cycle at reference rotation TB(0) stored in step S140 described above and the reference BD signal detection cycle TB at that time, as shown in FIG. 6, uses the calculated phase difference PD to generate the phase switching signal, and performs the phase switching control according to the generated phase switching signal.

As described above, when the brushless motor 70 is rotated at a high speed or is accelerated, it may be impossible to accurately detect the inductive voltage. On the other hand, even when the brushless motor 70 is rotated at a high speed or is accelerated, it is possible to acquire the BD signal without fail. Hence, in the present embodiment, when the brushless motor 70 is rotated at a high speed or is accelerated, the phase switching control of the brushless motor 70 is performed by referring to the BD signal and the phase difference, instead of the FG signal generated based on the inductive voltage.

On the other hand, when it is determined that the rotation speed of the brushless motor 70 is less than the particular threshold value Va and that the brushless motor 70 is not being accelerated (S150: NO), the CPU 31 performs the phase switching control of the brushless motor 70 based on the FG signal (S170). When the brushless motor 70 is rotated at a low rotation speed and is not accelerated, the inductive voltage can be detected accurately. Hence, the phase switching control of the brushless motor 70 is performed based on the FG signal generated from the inductive voltage.

The CPU 31 determines whether stop conditions of the brushless motor 70 such as the completion of the print process are satisfied (S180). When the CPU 31 determines that the stop conditions are not satisfied (S180: NO), the processes in steps S150, S160 and S170 described above are repeated. When the CPU 31 determines that the stop conditions of the brushless motor 70 are satisfied (S180: YES), the CPU 31 turns off the LD 61 to stop the brushless motor 70 (S190).

As described above, in the printer 100 of the present embodiment, when the brushless motor 70 is rotated at a high speed or is accelerated, the CPU 31 performs the phase switching control of the brushless motor 70 based on the BD signal and the phase difference between the BD signal and the FG signal. Here, since the FG signal is a signal that can determine the timing at which the inductive voltage produced in the coil 72 in the non-energization state caused by the rotation of the rotor 73 reaches a particular reference value, it is possible to detect the position of the rotor 73 based on the FG signal. Hence, when the phase difference between the BD signal and the FG signal is determined, it is possible to detect the position of the rotor 73 based on the BD signal. Since the BD signal indicates the timing at which the laser light L enters the BD 64 while the rotor 73 is being rotated, the BD signal can be detected even in an operation state in which the inductive voltage cannot be detected accurately, such as when the brushless motor 70 is accelerated or is rotated at a high speed. Hence, in the printer 100 of the present embodiment, regardless of what operation state the brushless motor 70 is in, it is possible to accurately detect the position of the rotor 73 and to accurately perform the phase switching control of the brushless motor 70.

In the printer 100 of the present embodiment, the CPU 31 detects the BD signal and the FG signal when the phase switching control based on the FG signal is performed after the rotor 73 is rotated by forced commutation, and acquires the phase difference based on the detected BD signal and FG signal. Hence, the CPU 31 acquires the phase difference between the BD signal and the FG signal, and accurately performs the phase switching control of the brushless motor 70 based on the acquired phase difference.

Figure 8:
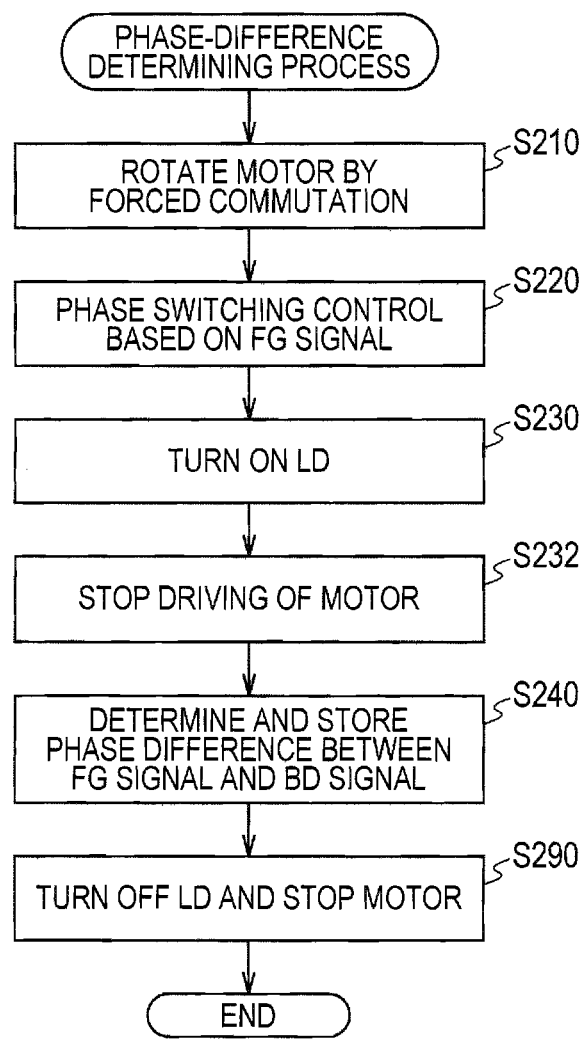
FIG. 8 is a flowchart showing the flow of a phase-difference determining process in another embodiment.

Another embodiment will then be described with reference to FIGS. 8 to 10. In the another embodiment, before shipment of the printer 100 from a factory, a phase-difference determining process shown in FIG. 8 is performed.

The CPU 31 first rotates and drives the brushless motor 70 by forced commutation (S210), generates the FG signal based on the inductive voltage of the coil 72 detected by the voltage detection circuit 78, and starts the phase switching control of the brushless motor 70 based on the FG signal (S220).

Then, the CPU 31 turns on the LD 61 in order to obtain the BD signal (S230), and thereafter stops driving of rotation of the brushless motor 70 (S232). Even after the stop of driving of rotation, the rotor 73 of the brushless motor 70 rotates by inertia for a certain period of time. The CPU 31 uses the FG signal and the BD signal detected when the rotor 73 is rotated by inertia to determine the phase difference between the FG signal and the BD signal and stores the phase difference in the storage area such as the ROM 32 (S240). Thereafter, the CPU 31 turns off the LD 61 to stop the brushless motor 70 (S290).

Figure 9:
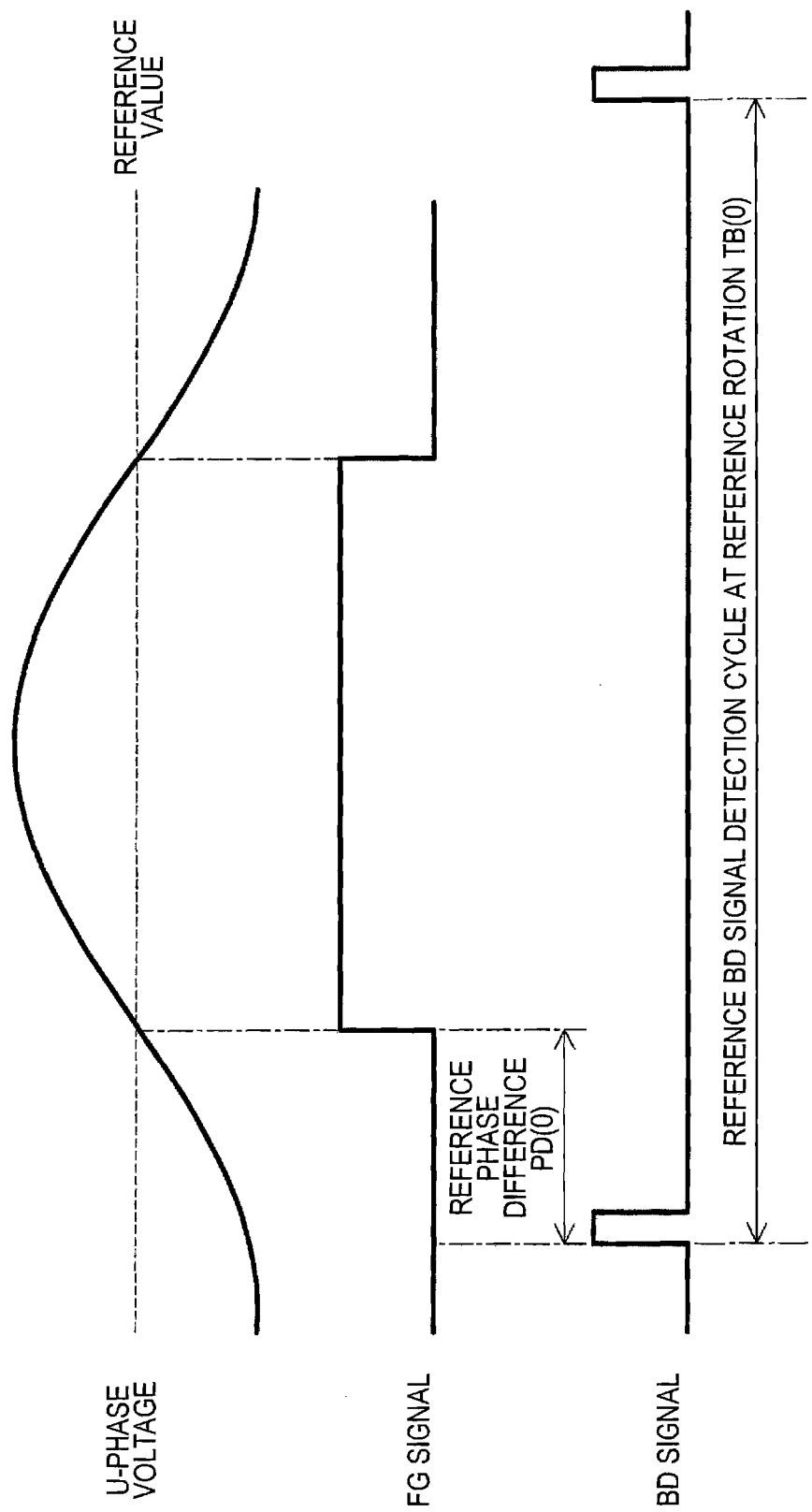
FIG. 9 is a timing chart showing the detection voltage of the U-phase coil in the another embodiment and the waveforms of the FG signal and the BD signal.

As shown in FIG. 9, since there is no effect of the drive voltage of the brushless motor 70, when the rotor 73 is rotated by inertia, the voltage of the coil 72 does not change in the shape of comb teeth (see FIG. 4) corresponding to a PWM cycle as the brushless motor 70 is driven to rotate but changes in the shape of a continuous curve. When the rotor 73 is rotated by inertia, the regeneration period described previously does not exist. Hence, when the rotor 73 is rotated by inertia, without being limited to the specific timing of the PWM cycle and without having the effect of the regeneration period, it is possible to detect the voltage of the coil 72 with arbitrary timing and to more accurately detect the timing at which the inductive voltage reaches a particular reference value. Consequently, the phase difference between the BD signal and the FG signal can be determined more accurately.

Figure 10:
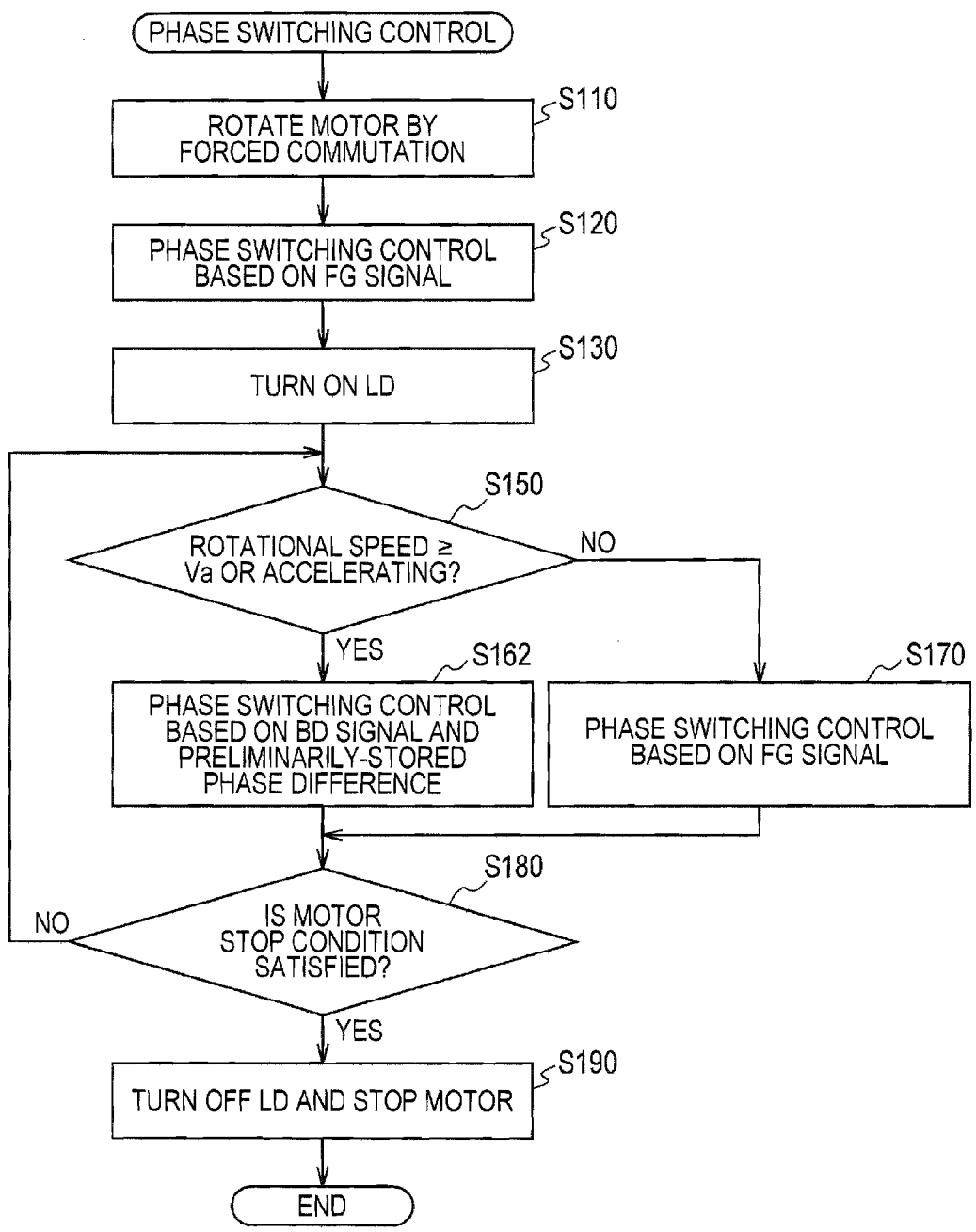
FIG. 10 is a flowchart showing the flow of phase switching control in the another embodiment.

In the another embodiment, when a print instruction is inputted after shipment of the printer 100, the phase switching control of the brushless motor 70 shown in FIG. 10 is performed. In the individual steps of the flowchart shown in FIG. 10, the steps having the same content as the steps of the flowchart shown in FIG. 7 are identified with the same numerals, and their description will be omitted. The phase switching control shown in FIG. 10 differs from that shown in FIG. 7 in that step S140 is not performed and that step S162 is performed instead of step S160.

In other words, in the phase switching control shown in FIG. 10, since the phase-difference determining process shown in FIG. 8 is performed before the start of the process, the process (S140 in FIG. 7) for determining the phase difference is not performed again. When the phase switching control of the brushless motor 70 based on the BD signal and the phase difference is performed (S162), the phase difference stored in the previously performed phase-difference determining process (FIG. 8) is used.

As described above, in the another embodiment shown in FIGS. 8 to 10, the CPU 31 detects the BD signal and also reads the phase difference previously stored in the storage area such as the ROM 32 and performs the phase switching control of the brushless motor 70 based on the detected BD signal and the read phase difference. Hence, in this embodiment, as compared with the case where the process for determining the phase difference (S140 in FIG. 7) is performed after shipment of the printer 100, the convenience of the user is improved.

In the another embodiment shown in FIGS. 8 to 10, the phase difference is determined and stored based on the FG signal and the BD signal when driving of rotation of the brushless motor 70 is stopped and the rotor 73 is rotated by inertia. Thus, the phase difference between the BD signal and the FG signal can be determined more accurately, so that the phase switching control of the brushless motor 70 can be performed more accurately based on the BD signal and the phase difference.

While the disclosure has been described in detail with reference to the above aspects thereof, it would be apparent to those skilled in the art that various changes and modifications may be made therein without departing from the scope of the claims. In the following description, like parts and components are designated by the same reference numerals to avoid duplicating description.

The configuration of the printer 100 in the embodiment described above is simply an example, and various variations are possible. For example, the processes performed by one CPU 31 in the embodiment may be performed a plurality of CPUs, one or a plurality of ASICs or a combination between one or a plurality of CPUs and one or a plurality of ASICs. In such a case, the main unit that performs the process is an example of the controller. Hardware, such as the CPU 31, that is used for controlling the printer 100 is collectively referred to as the controller 30, and the controller 30 is not limited to a single piece of hardware provided in the printer 100.

In the embodiment described above, the number of poles of the rotor 73 is 12, and number of mirror surfaces 81 of the polygon mirror 80 is six. However, the number of poles of the rotor 73 and the number of mirror surfaces 81 of the polygon mirror 80 are not limited to these numbers.

The details of the phase switching control of the brushless motor 70 in the embodiment described above are simply an example, and various variations are possible. For example, in the phase switching control shown in FIG. 7, the phase difference between the FG signal and the BD signal is determined based on the FG signal and the BD signal that are detected when the phase switching control is performed based on the FG signal after the brushless motor 70 is driven to rotate by forced commutation. However, the phase difference between the FG signal and the BD signal may be determined based on the FG signal and the BD signal that are detected when the rotor 73 is rotated by inertia. In contrast, in the phase-difference determining process shown in FIG. 8, the phase difference between the FG signal and the BD signal is determined based on the FG signal and the BD signal that are detected when the rotor 73 is rotated by inertia. However, the phase difference between the FG signal and the BD signal may be determined based on the FG signal and the BD signal that are detected when the phase switching control is performed based on the FG signal after the brushless motor 70 is driven to rotate by forced commutation.

In the embodiment described above and the another embodiment, the phase difference between the FG signal and the BD signal may be determined based on the FG signal and the BD signal that are detected when the brushless motor 70 is driven to rotate by forced commutation. Even in such a case, the phase difference can be determined based on the BD signal and on the FG signal obtained based on the value of the inductive voltage detected in the non-energization period. In this case, it is preferable that the FG signal that is detected after a certain period time has elapsed since the start of the forced commutation of the brushless motor 70 (that is, after the rotation speed of the brushless motor 70 reaches a certain value or higher) be used to determine the phase difference.

Although the phase-difference determining process shown in FIG. 8 is performed before shipment of the printer 100 from the factory, the process may be performed after shipment of the printer 100 from the factory. Examples of the timing at which the phase-difference determining process is performed include timing at which an instruction to perform calibration is inputted to the printer 100. Alternatively, the following timing may be adopted. the phase-difference determining process shown in FIG. 8 is performed at timing when, after the shipment from the factory, a print instruction is first inputted to the printer 100 and the phase difference is stored, and thereafter even when a print instruction is inputted, the phase-difference determining process is not performed, and the phase difference stored in the previous phase-difference determining process is used.

Figure 7:
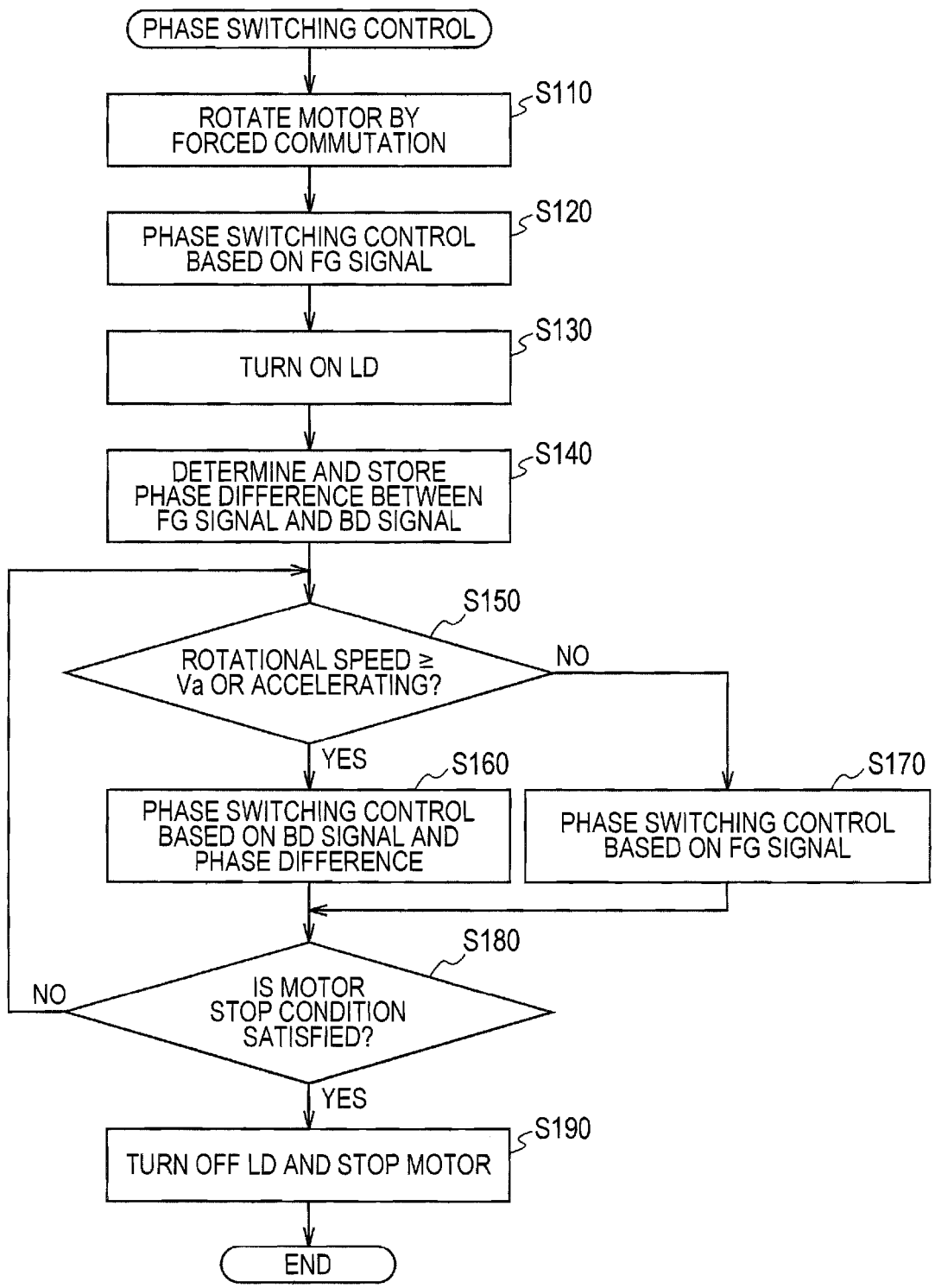
FIG. 7 is a flowchart showing the flow of a phase switching control.

Even when the phase-difference determining process shown in FIG. 8 is performed before shipment of the printer 100 from the factory, after shipment of the printer 100 from the factory, the phase-difference determining process shown in FIG. 8 may be performed again or the phase switching control shown in FIG. 7 may be performed.

In the phase-difference determining process shown in FIG. 8, the brushless motor 70 is first driven to rotate by forced commutation, then driving of rotation is stopped and the rotor 73 is rotated by inertia. The method of driving of rotation at that time is not limited to the forced commutation, and driving of rotation may be performed with reference to timing at which the inductive voltage reaches a reference value.

In the embodiment described above, the phase difference between the FG signal and the BD signal may be determined a plurality of times, and the phase switching control of the brushless motor 70 may be performed based on the average value thereof. In this way, it is possible to more accurately determine the phase difference between the FG signal and the BD signal, and thus it is possible to more accurately perform the phase switching control of the brushless motor 70.

In the embodiment described above, the phase difference between the FG signal and the BD signal for a certain phase (for example, the U phase) is determined, and the phase switching control of the brushless motor 70 is performed based on the phase difference. However, the phase difference between the FG signal and the BD signal for each phase may be determined, and the phase switching control may be performed based on the phase difference corresponding to the phase related to the switching. In this way, even when variations in the phase difference between the FG signal and the BD signal for each phase are produced, the phase switching control of the brushless motor 70 can be performed more accurately.

In the embodiment described above, when the rotation speed of the brushless motor 70 is equal to or higher than the threshold value Va or the brushless motor 70 is accelerated, the phase switching control of the brushless motor 70 based on the BD signal and the phase difference is performed. When the rotation speed of the brushless motor 70 is less than the threshold value Va and the brushless motor 70 is not accelerated, the phase switching control of the brushless motor 70 based on the FG signal is performed. However, the method of using both the cases is not limited to the method described above. For example, when the rotation speed of the brushless motor 70 is equal to or higher than the threshold value Va and the brushless motor 70 is accelerated, the phase switching control of the brushless motor 70 based on the BD signal and the phase difference may be performed, whereas when the rotation speed of the brushless motor 70 is less than the threshold value Va or the brushless motor 70 is not accelerated, the phase switching control of the brushless motor 70 based on the FG signal may be performed. Or, the phase switching control based on the BD signal and the phase difference may be performed in any operation state of the brushless motor 70, regardless of whether the rotation speed of the brushless motor 70 is high or low or whether the brushless motor 70 is accelerated.

In the embodiment described above, the phase difference between the BD signal and the FG signal is represented by time. However, the phase difference may be represented by an angle.

The polygon mirror 80 and the rotor 73 may be assembled such that the angle of the mirror surface 81 of the polygon mirror 80 and the position of the magnet of the rotor 73 have a specific relationship. In this way, the phase difference between the FG signal and the BD signal is made to be a specific value (for example, zero). In other words, in this way, it is not necessary to actually rotate the brushless motor 70, to detect the FG signal and the BD signal, and to determine the phase difference between the FG signal and the BD signal. The phase difference described above may be stored in the storage area such as the ROM 32, and after shipment of the printer 100, the phase switching control of the brushless motor 70 may be performed based on the stored phase difference and the BD signal. For example, when the phase difference is zero, the phase switching control of the brushless motor 70 can be performed based on the BD signal itself.

Figure 11:
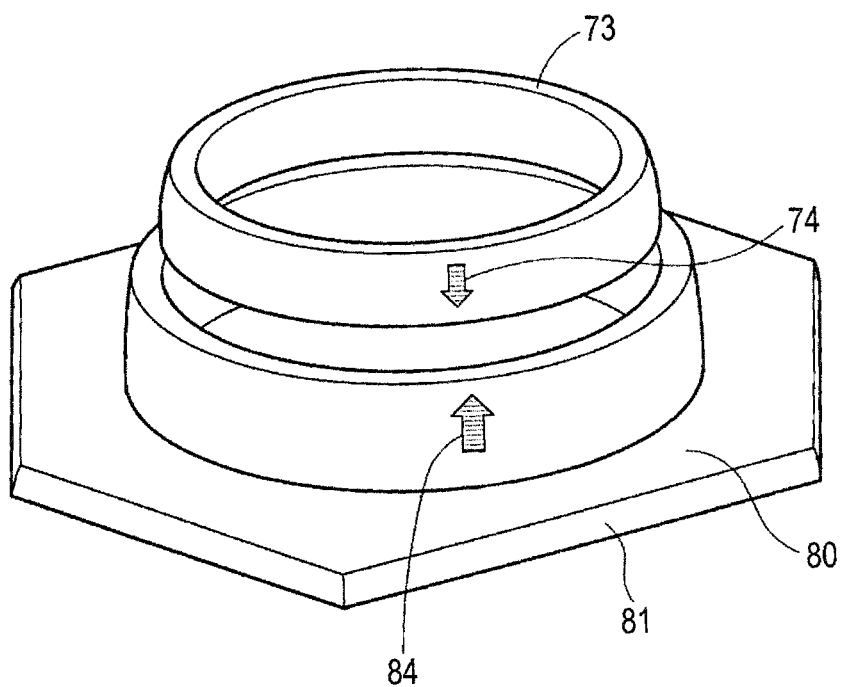
FIG. 11 is a schematic view showing a relationship between a polygon mirror and a rotor in a modification.

As shown in FIG. 11, guides 84 and 74 are preferably provided in the polygon mirror 80 and the rotor 73, respectively, so that the angle of the mirror surface 81 of the polygon mirror 80 and the position of the magnet of the rotor 73 have a specific relationship. In this way, the polygon mirror 80 and the rotor 73 are assembled such that the position of the guide 84 of the polygon mirror 80 and the position of the guide 74 of the rotor 73 coincide with each other, with the result that the angle of the mirror surface 81 of the polygon mirror 80 and the position of the magnet of the rotor 73 can easily be made to have a specific relationship. The guides 84 and 74 may be drawn, printed, or attached on the surfaces of the polygon mirror 80 and the rotor 73, or may be formed by processing the polygon mirror 80 and the rotor 73 into a concave shape or a convex shape. Alternatively, the guides 84 and 74 may be combined to have such shapes that the guides 84 and 74 are fitted to each other. For example, the guide 84 may be a concave portion formed in the polygon mirror 80, and the guide 74 may be formed in the rotor 73 into a convex portion that is fitted to the concave portion formed in the polygon mirror 80.

Figure 5:
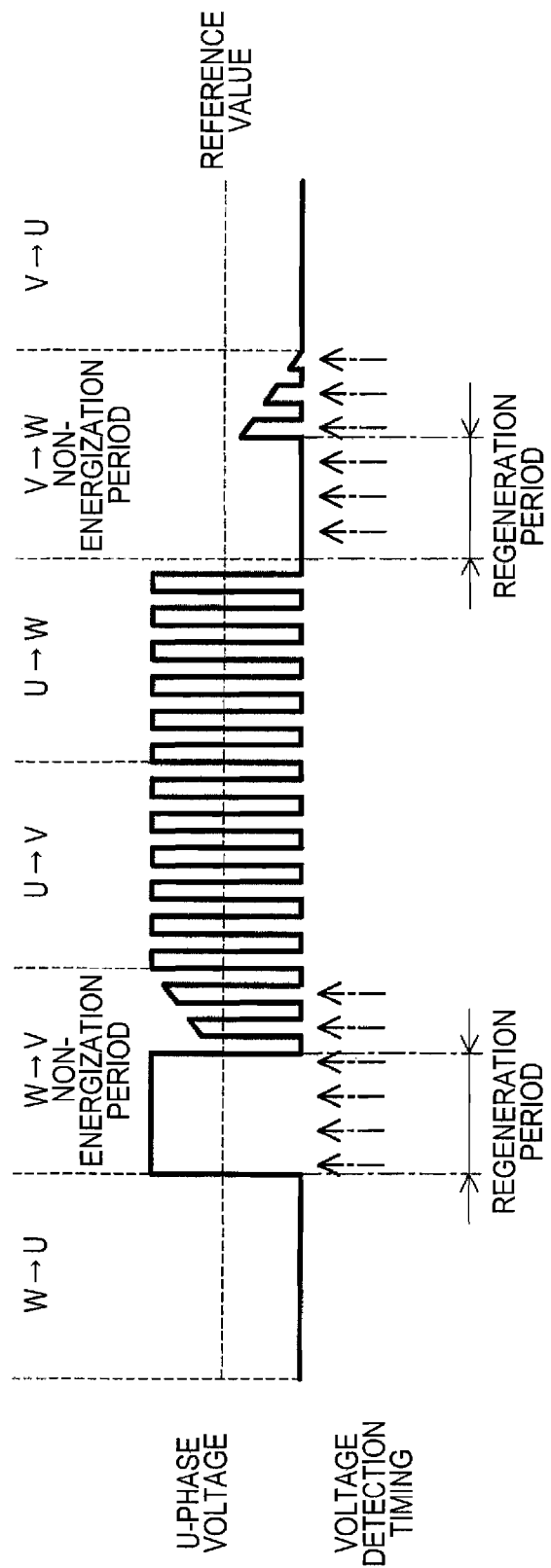
FIG. 5 is a timing chart showing the detection voltage of the U-phase coil.

As shown in FIG. 5, when the regeneration period is prolonged such that it is impossible to detect the timing at which the inductive voltage produced in the coil 72 reaches a particular reference value, the following control (1) or (2) can be performed.

(1) The voltage of the coil 72 is detected after a particular time has elapsed since the timing of the previous phase switching control. And, when it is determined from the level of the detected voltage that it is the regeneration period (the region of a counter-electromotive voltage), it is immediately determined that the inductive voltage reaches the particular reference value, and the subsequent phase switching control is performed after the elapse of a particular period.

(2) The voltage of the coil 72 is measured after the completion (the non-energization period) of the regeneration period (the region of a counter-electromotive voltage). And, when the voltage level has already been equal to or higher than (or equal to or lower than) the reference value, it is immediately determined that the inductive voltage reaches the reference value, and the subsequent phase switching control is performed after the elapse of a particular period.

In the embodiment described above, as an example of the image forming apparatus, the monochrome-type printer 100 that forms an image with toner of one color is described. As another example of the image forming apparatus, there is a color printer that forms an image with toner of a plurality of colors. The present disclosure can be also applied to such a color printer.

What is claimed is:

1. An image forming apparatus comprising:
   a brushless motor having a rotor and a stator, the stator having coils corresponding to respective phases of the brushless motor;
   a polygon mirror having a plurality of mirror surfaces and configured to rotate together with the rotor;
   a light source;
   a light sensor;
   a processor; and
   a memory storing instructions, the instructions, when executed by the processor, causing the processor to:
      detect a first signal that is outputted by the light sensor when the light sensor receives a light beam, the light beam being emitted from the light source and reflected by one of the plurality of mirror surfaces when the rotor is rotating;
      detect a second signal that identifies timing at which an inductive voltage reaches a particular reference value, the inductive voltage being generated in at least one coil in a non-energization state due to rotation of the rotor;
      acquire a phase difference between the first signal and the second signal;
      generate a phase switching signal using the first signal and the phase difference, the phase switching signal being a signal for switching the phases of the brushless motor; and
      perform a phase switching control of the brushless motor based on the phase switching signal.

2. The image forming apparatus according to claim 1, wherein, when executed by the processor, the instructions cause the processor to:
   drive the rotor to rotate; and
   after stopping driving the rotor to rotate,
      detect the first signal and the second signal when the rotor is rotating; and
      acquire the phase difference based on the first signal and the second signal.

3. The image forming apparatus according to claim 1, wherein, when executed by the processor, the instructions cause the processor to:
   detect the first signal and the second signal when the rotor is rotating due to forced commutation; and
   acquire the phase difference based on the first signal and the second signal.

4. The image forming apparatus according to claim 2, wherein, when executed by the processor, the instructions cause the processor to:

acquire the phase difference a plurality of times; and
perform the phase switching control of the brushless motor by referring to an average of values indicative of the relationship identified by the phase difference and acquired in each of the plurality of times.

5. The image forming apparatus according to claim 1, wherein, when executed by the processor, the instructions cause the processor to:
acquire the phase difference for each phase of the brushless motor; and
perform the phase switching control of the brushless motor by referring to the phase difference corresponding to a phase relating to switching.

6. The image forming apparatus according to claim 1, wherein, when executed by the processor, the instructions cause the processor to perform the phase switching control of the brushless motor based on phase switching signal, when both of following conditions are satisfied:
the brushless motor is accelerating; and
a rotational speed of the brushless motor is higher than or equal to a particular threshold.

7. The image forming apparatus according to claim 1, wherein the phase difference for performing the phase switching control is calculated according to equation (1):

$$PD=PD(0) \times TB/TB(0) \qquad (1)$$

where the "$PD(0)$" is the phase difference between the first signal and the second signal at time of reference rotation when the rotor is rotated in an operation state where the inductive voltage is detected accurately, the "$TB$" is a detection cycle of the first signal when the phase switching control is performed, and the "$TB(0)$" is a detection cycle of the first signal at the time of the reference rotation.

8. The image forming apparatus according to claim 1, wherein, when executed by the processor, the instructions cause the processor to:
drive the rotor to rotate such that each phase of the brushless motor repeats an energization state and a non-energization state alternately; and
detect the first signal and the second signal when the rotor is driven to rotate, the inductive voltage being generated in at least one coil corresponding to a particular phase in the non-energization state while at least one coil corresponding to another phase is in the energization state.

9. The image forming apparatus according to claim 1, wherein, when executed by the processor, the instructions cause the processor to perform the phase switching control of the brushless motor based on the phase switching signal, when at least one of following conditions is satisfied:
the brushless motor is accelerating; and
a rotational speed of the brushless motor is higher than or equal to a particular threshold.

10. A method of controlling an image forming apparatus including:
a brushless motor having a rotor and a stator, the stator having coils corresponding to respective phases of the brushless motor; a polygon mirror having a plurality of mirror surfaces and configured to rotate together with the rotor; a light source; and a light sensor, the method comprising:
detecting a first signal that is outputted by the light sensor when the light sensor receives a light beam, the light beam being emitted from the light source and reflected by one of the plurality of mirror surfaces when the rotor is rotating;
detecting a second signal that identifies timing at which an inductive voltage reaches a particular reference value, the inductive voltage being generated in at least one coil in a non-energization state due to rotation of the rotor;
acquiring a phase difference between the first signal and the second signal;
generating a phase switching signal using the first signal and the phase difference, the phase switching signal being a signal for switching the phases of the brushless motor; and
performing a phase switching control of the brushless motor based on the phase switching signal.

11. The method according to claim 10, wherein the phase difference for performing the phase switching control is calculated according to equation (1):

$$PD=PD(0) \times TB/TB(0) \qquad (1)$$

where the "$PD(0)$" is the phase difference between the first signal and the second signal at time of reference rotation when the rotor is rotated in an operation state where the inductive voltage is detected accurately, the "$TB$" is a detection cycle of the first signal when the phase switching control is performed, and the "$TB(0)$" is a detection cycle of the first signal at the time of the reference rotation.

12. The method according to claim 10, further comprising:
driving the rotor to rotate such that each phase of the brushless motor repeats an energization state and a non-energization state alternately; and
detecting the first signal and the second signal and the second when the rotor is driven to rotate, the inductive voltage being generated in at least one coil corresponding to a particular phase in the non-energization state while at least one coil corresponding to another phase is in the energization state.

13. The method according to claim 1, further comprising performing the phase switching control of the brushless motor based on the phase switching signal, when at least one of following conditions is satisfied:
the brushless motor is accelerating; and
a rotational speed of the brushless motor is higher than or equal to a particular threshold.

14. A non-transitory storage medium storing a set of program instructions executable on an image forming apparatus including: a brushless motor having a rotor and a stator, the stator having coils corresponding to respective phases of the brushless motor; a polygon mirror having a plurality of mirror surfaces and configured to rotate together with the rotor; a light source; and a light sensor, the set of program instructions comprising:
detecting a first signal that is outputted by the light sensor when the light sensor receives a light beam, the light beam being emitted from the light source and reflected by one of the plurality of mirror surfaces when the rotor is rotating;
detecting a second signal that identifies timing at which an inductive voltage reaches a particular reference value, the inductive voltage being generated in at least one cod in a non-energization state due to rotation of the rotor;
acquiring a phase difference between the first signal and the second signal;
generating a phase switching signal using the first signal and the phase difference, the phase switching signal being a signal for switching the phases of the brushless motor; and
performing a phase switching control of the brushless motor based on the phase switching signal.

15. The non-transitory storage medium according to claim 14, wherein the phase difference for performing the phase switching control is calculated according to equation (1):

$$PD = PD(0) \times TB/TB(0) \qquad (1)$$

where the "PD(0)" is the phase difference between the first signal and the second signal at time of reference rotation when the rotor is rotated in an operation state where the inductive voltage is detected accurately, the "TB" is a detection cycle of the first signal when the phase switching control is performed, and the "TB(0)" is a detection cycle of the first signal at the time of the reference rotation.

16. The non-transitory storage medium according to claim 14, wherein the set of program instructions comprises:
  driving the rotor to rotate such that each phase of the brushless motor repeats an energization state and a non-energization state alternately; and
  detecting the first signal and the second signal when the rotor is driven to rotate, the inductive voltage being generated in at least one coil corresponding to a particular phase in the non-energization state while at least one coil corresponding to another phase is in the energization state.

17. The non-transitory storage medium according to claim 14, wherein the set of program instructions comprises performing the phase switching control of the brushless motor based on the phase switching signal, when at least one of following conditions is satisfied:
  the brushless motor is accelerating; and
  a rotational speed of the brushless motor is higher than or equal to a particular threshold.

18. The image forming apparatus according to claim 1, wherein the second signal is a signal that is generated based on a voltage value of the at least one coil in the non-energization state.

19. The method according to claim 10, wherein the second signal is a signal that is generated based on a voltage value of the at least one coil in the non-energization state.

20. The non-transitory storage medium according to claim 14, wherein the second signal is a signal that is generated based on a voltage value of the at least one coil in the non-energization state.

* * * * *